United States Patent Office 3,307,963
Patented Mar. 7, 1967

3,307,963
ACRYLATE-POLYSTYRENE PRESSURE
SENSITIVE ADHESIVE TAPE
Charles S. Webber, Loudonville, N.Y., assignor to Norton Company, Troy, N.Y., a corporation of Massachusetts
No Drawing. Filed Mar. 5, 1964, Ser. No. 349,732
5 Claims. (Cl. 117—68.5)

The present invention relates to a pressure sensitive adhesive tape and, more particularly, to a tape having an improved resinous mass.

Pressure sensitive tapes are generally comprised of a backing such as a transparent plastic film and an adhesive mass coated on the backing. The tapes are characterized by being capable of sticking firmly to surfaces on contact. When applied to non-fibrous surfaces, they may be stripped back without leaving a deposit of adhesive.

In order that the tape will possess these characteristics, it is known to be necessary that the mass have a balance of four properties referred to respectively as cohesion (internal strength), elasticity (retractive force when stretched and retraction when released after stretching), adhesion (tackiness) and stretchiness (elongation under low stresses). This balance of properties frequently is achieved by combining two or more materials. For example, a natural or synthetic rubber which has good cohesion and elasticity characteristics may be combined with a rosin ester which adds tackiness, with an attendant modification of stretchiness and elasticity. It is also known that polymers derived from esters of acrylic acid are inherently normally tacky and pressure sensitive and have the necessary balance of properties in a single material, thereby avoiding certain disadvantages inherent in rosin esters. However, the acrylic polymers are quite expensive and for this reason are not a fully adequate replacement for rubber-rosin adhesive masses.

In accordance with the present invention, a polymeric extender is added to an acrylic ester polymer which reduces the amount which must be used and consequently lowers the cost of the mass, without rendering the product inadequate in the above-mentioned balance of properties or other desirable adhesive characteristics. More particularly, an adhesive mass is made by adding to an acrylate ester polymer a polymer of α-methyl styrene, preferably with an additional substance which improves the compatibility of the acrylate and methyl styrene polymers.

The acrylic ester polymer may be a polymer or copolymer of one or more esters of acrylic acid in which acrylic acid ester is at least the major constituent. The acrylic ester preferably is a lower ester having on the average up to 8 carbon atoms in the alcohol moiety. For example, ethyl acrylate, butyl acrylate and 2-ethyl hexyl acrylate may be used. The polymer may also contain minor amounts of other ethylenically unsaturated monomers such as styrene or vinyl esters. It may be made by any process known to those skilled in the art, i.e., by polymerization in bulk or solution or aqueous suspension, in the presence or absence of free radical initiators, this procedure forming no part of the instant invention. The acrylate ester polymer is uniformly blended with the methyl styrene polymer, preferably by dissolving them in a mutual solvent. Suitable solvents include toluene, xylene and other aromatic hydrocarbons and aliphatic esters such as ethyl acetate. The solution may be applied directly to a backing layer and evaporated. Generally, there should be at least 55% of the acrylate ester polymer and less than 45% of the methyl styrene polymer; compositions containing smaller amounts of acrylic ester polymer tend to be cloudy, which is indicative of insufficient compatibility. It will be appreciated that the polymers must be completely compatible so that they can cooperate to function as a uniform adhesive composition. Compositions containing more than 45% of the methyl styrene polymer also tend to be undesirably soft and weak. There no minimum quantity of the methyl styrene polymer which may be added, but the largest amount possible generally should be used. However, to achieve the advantages of the invention, it is desirable to use at least about 5% of the total weight of the composition.

In addition to the above two constituents, it is preferred to include a third constituent which improves compatibility. For this purpose, two materials have been found particularly suitable, namely, sucrose acetate isobutyrate and a copolymer of vinyl acetate with an acrylic acid ester, preferably of the type referred to above. It is to be understood that these materials as well as the α-methyl styrene polymer are not of themselves suitable for the purposes of the invention. Various mixtures of them have been made and have been found to be inadequate in one or more of the four characterizing properties of pressure-sensitive adhesives. However, they may be added to the acrylic ester polymers which are pressure-sensitive adhesives without rendering them unsatisfactory. In general, the sucrose acetate isobutyrate or the vinyl acetate-acrylate copolymer is dissolved in the same mutual solvent referred to above, for the purpose of blending it with the other constituents of the composition. The amount of this third constituent should not exceed the amount of said acrylate ester resin, and preferably should not exceed about 50% thereof.

The above-described adhesive mass is particularly useful for application to a transparent backing since it is itself clear and essentially transparent when pressed against a surface. Many transparent backing films may be employed so long as they are sufficiently solvent resistant, but cellulose acetate is especially desirable since the mass adheres sufficiently to it without any intervening layer. As is known, it is frequently necessary to apply a primary coating to a backing layer which is strongly adhesive toward the backing and the main pressure-sensitive adhesive mass. However, this primer is avoided in the case in which cellulose acetate is the backing.

As is customary for pressure sensitive tapes, a coating or backsize is applied to the rear surface of the backing film to permit winding the tape in rolls without delamination on unwinding. It is selected to be strongly adhered to the backing but less strongly adhered to the adhesive mass. In accordance with one aspect of the invention, the backsize comprises a silicone resin. The silicone is preferably applied to the backing in a form which permits curing in place. It is composed essentially of repeating units of the formula $$[R_n SiO_{(4-n)}]$$

in which R may be alkyl, e.g. methyl or ethyl, aryl, e.g., phenyl, tolyl, xylyl or naphthyl, alkenyl, e.g., vinyl or allyl, or cycloalkyl, e.g., cyclohexyl. To render them curable, the silicones may contain silicon bonded hydroxyl groups of the formula $$\equiv Si\!-\!O\!-\!H$$

or equivalent groups which may be hydrolyzed to provide silicon bonded hydroxyl groups, for example:

$$\equiv Si\!-\!H, \equiv Si\!-\!O\!-\!Na$$
$$\equiv Si\!-\!O\!-\!K, \text{ or}$$
$$\equiv Si\!-\!O\!-\!R$$

where R is an organic group. Curable silicone resins which are particularly useful are silicone resins of intermediate molecular weight and which undergo further polymerization and/or cross-linking in the presence of catalytic curing agents. It is particularly desirable to select a silicone resin which cures at relatively low temperature, preferbaly room temperature; lower curing temperatures minimize the possible harmful influence of heat on the backing film.

In addition to the backsize, there may be applied a coating which renders the backing receptive to writing. Cellulose acetate and other plastics which may be used as backings for transparent pressure sensitive tapes have smooth surfaces which are not readily receptive to pencil or ink. It is possible to emboss the surface of the plastic film with a pattern of small dots or the like to render it sufficiently rough, but this is not practical for example in the case of cellulose acetate which is sufficiently hard to wear the embossing rolls very rapidly. In accordance with one aspect of the invention, there is applied to the back surface of a backing layer a lacquer containing fine aggregate particles in a plastic binder. A particularly desirable aggregate is silica which has a particle size less than about 0.1 micron. The silica may be present in a binder such as cellulose-acetate butyrate or a vinylidene chloride polymer which readily adheres to the backing layer and the backsize applied over it.

The invention is illustrated by the following specific examples, in which all parts are by weight unless otherwise indicated.

*Example 1*

An adhesive mass was made by dissolving in toluene 80 parts dry weight of an acrylate ester resin known and available as Catalin A 1120,[1] 10 parts dry weight of a 55% solution in a 2:1 mixture of isopropyl acetate and toluene of a vinyl acetate-acrylate copolymer known and available as Shawinigan D-267,[2] and 75 parts dry weight of a 50% solution in toluene of a poly-α-methyl styrene known and available as Dow 276V9.[3] The solution was applied to a 1 mil cellulose acetate film and dried. Then pieces of the tape were applied to glass and metal surfaces. It was found that they could be removed easily without delamination. Other samples were applied to metal surfaces such as copper and brass to determine whether the mass had a tendency to cause staining. The metal was heated but there was no evidence of staining of the type which is commonly caused by pressure sensitive adhesive tapes.

*Example 2*

Example 1 was repeated except that 60 of the 75 parts of poly-α-methyl styrene were replaced by 50 parts of sucrose acetate isobutyrate. A satisfactory mass was obtained.

*Example 3*

For purposes of comparison, Example 1 was repeated using 50 parts of poly-α-methyl styrene, 40 parts of the acrylate ester polymer and 10 parts of the vinyl acetate polymer. The product was hazy, indicating an undesirable lack of compatibility of the constituents.

*Example 4*

The tape of Example 1 was coated, on its back, with a lacquer containing 12 parts of a fume silica having a particle size in the range 0.15–0.020 micron and a surface area (nitrogen absorption) of 175–200 square meters/gram. The lacquer consisted of 100 parts vinylidene chloride-acrylonitrile copolymer (Saran F220) in about 600 parts of a mixture of methyl isobutyl ketone, tetrahydrofurane, xylene and Cellosolve acetate. This coating was dried and was found to render the tape receptive to written or type indicia of ink or pencil. There was also applied over it a coating of a room temperature curable mixture of silicones which, on setting, permitted the tape to be wound in a roll and unwound without delamination.

The invention now having been described by reference to preferred embodiments, it will be appreciated that various modifications may be made in the composition and procedures without departing from the scope of the invention, as this is defined in the claims.

What is claimed is:

1. A pressure sensitive adhesive tape comprising a backing and, applied to a surface thereof, an adhesive mass consisting essentially of a polymer of an acrylic ester in which the acrylic ester is the major constituent and has an average of up to eight carbon atoms in the alcohol moiety, poly-alpha-methyl styrene present in an amount of between five and forty-five percent by weight of the total adhesive mass, and up to fifty percent based upon the weight of said polymer of an acrylic ester of sucrose acetate-isobutyrate.

2. A pressure sensitive adhesive tape as set forth in claim 1 in which said backing layer comprises a flexible cellulose acetate film.

3. A pressure sensitive adhesive tape as set forth in claim 2 including a backsize layer on the back of said film which comprises a silicone resin.

4. A pressure sensitive adhesive tape as set forth in claim 2 including a coating on the back of said film which renders it receptive to writing, said coating comprising a finely divided aggregate in a resin binder.

5. A pressure sensitive adhesive tape as set forth in claim 4 in which said aggregate is silica having a particle size not exceeding 0.1 micron and said resin binder is a vinylidene chloride polymer.

References Cited by the Examiner

UNITED STATES PATENTS

| | | | |
|---|---|---|---|
| 2,421,640 | 6/1947 | New et al. | 117—122 |
| 2,646,371 | 7/1953 | McGarry | 117—122 |
| 2,783,166 | 2/1957 | Deanin | 117—122 |
| 2,785,087 | 3/1957 | Franer et al. | 117—68.5 |
| 2,795,515 | 6/1957 | Lavanchy | 117—122 X |
| 2,806,015 | 9/1957 | Kern | 260—901 X |
| 2,914,166 | 11/1959 | Bihler | 206—56 |
| 3,076,726 | 2/1963 | Ault | 117—155 |
| 3,092,250 | 6/1963 | Knutson et al. | 117—122 X |
| 3,096,324 | 7/1963 | Goins et al. | 260—234 |
| 3,158,493 | 11/1964 | Long et al. | 161—192 X |
| 3,208,093 | 9/1965 | Hansen | 117—122 X |
| 3,252,234 | 5/1966 | Goodman | 140—2 |
| 3,268,357 | 8/1966 | Hart et al. | 117—122 |

FOREIGN PATENTS 667,331  7/1963  Canada.

WILLIAM D. MARTIN, *Primary Examiner.*

W. D. HERRICK, *Assistant Examiner.*

---

[1] Described in Catalin Corp. Technical Data Sheet "Resin A-1120" (Rev. 1), October 1962.
[2] Solution viscosity 10–20×10³ cps. at 25° C.
[3] Viscosity 700–1000 cps. at 60° C., boiling range at 5 mm. Hg 150–300°, specific gravity 60/60° F., 1.04 refractive index at 60° F., 1.57, acid number less than 1, dielectric constant (10³ cps.) 2.60 and color-iodine standard =0.85.